United States Patent Office

2,760,959
COPPERABLE DISAZO DYESTUFFS

Werner Bossard, Riehen, near Basel, and Marcel Reding, Basel, Switzerland, assignors to J. R. Geigy A. G., Basel, Switzerland, a Swiss firm No Drawing. Application May 1, 1953,
Serial No. 352,570

Claims priority, application Switzerland May 8, 1952

8 Claims. (Cl. 260—175)

The present invention concerns the production of new, metallisable disazo dyestuffs, the coppered dyeings on cellulose of which have such good wet fastness properties that they withstand repeated soap washings. The new dyestuffs, which dye in greenish-yellow shades, thus enrich the group of copperable cellulose dyestuffs which are fast to light and washing in a part of the spectrum where, up to now, the number of dyestuffs available have been insufficient due to the high demands made upon them. They close a gap therefore, in this valuable class of dyestuffs.

Among other things U. S. Patent No. 2,515,546 shows that by coupling 1 mol of both a diazotised 2-amino-1-hydroxybenzene and 2-amino-1-carboxybenzene compound with a 4.4′-di-acetoacetylaminodiphenyl compound, metallisable disazo dyestuffs can be obtained, the coppered cellulose dyeings of which withstand repeated soap washings. They dye however, in somewhat reddish-yellow shades. The drawing power of previously known similar disazo dyestuffs from 2 mols of diazotised 2-amino-1-carboxybenzene compounds is inferior and such dyestuffs produce coppered cellulose dyeings the slight wet fastness properties of which do not withstand repeated soap washings.

It has now been found that valuable greenish-yellow to pure yellow copperable disazo dyestuffs can be obtained if 1 mol of an unsulphonated 4.4′-di-acetoacetylamino-diphenyl compound which can be further substituted in the 3.3′-position is coupled with 1 mol of both a diazonium compound of the general formula:

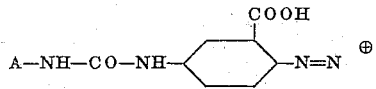

and 1 mol of an o-carboxy-diazonium compound of the benzene or naphthalene series, which may also be identical with the first diazonium compound. The components can be coupled in any order. In the above formula A represents a radical of the benzene or naphthalene series which is substituted by at least one acid water-solubilising group and which in addition, can contain the other substituents usual in azo dyestuffs.

Apart from 4.4′-di-acetoacetylamino-diphenyl itself, derivatives thereof substituted in the 3.3′-position by low molecular alkyl and alkoxy groups or by halogen can be named as azo components usable according to the present invention. Of these, 3.3′-dimethoxy-4.4′-diaminodiphenyl produces dyestuffs which have excellent wet fastness properties but are of a more reddish shade, and 3.3′-dichloro-4.4′-diaminodiphenyl and 3.3′-dimethyl-4.4′-diaminodiphenyl produce the most interesting disazo dyestuffs according to this invention in regard to shade and properties.

The characteristic diazo components corresponding to the above formula can be produced from 1 mol of 5-amino-2-acetylaminobenzene-1-carboxylic acid and 1 mol of a primary amino compound of the benzene and naphthalene series which corresponds to A, and which contains at least one sulphonic acid or carboxyl group as acid water-solubilising group and in addition can be further substituted by the halogen, alkyl, alkoxyl, hydroxyl groups or heterocyclic radicals usual in azo dyestuffs. The diazo components are produced by treating the aqueous solution of the alkali salts either with phosgene until the primary amino groups have disappeared or by acylating first one of the components, preferably that corresponding to A, with a chloroformic acid phenol ester and treating the other component in aqueous solution of the alkali salts with the arylcarbamic acid phenol ester so obtained until the unsymmetrical urea derivative is formed with splitting off of phenol, whereupon the acetylamino group is saponified under mild conditions. The symmetrical urea derivatives also obtained by the first method can be removed after saponification of the acetylamino groups with diluted mineral acids because of the different solubility of the alkali salts in water.

Amino compounds of the benzene and naphthalene series which correspond to A and are usable are, e. g. 3- or 4-aminobenzene-1-sulphonic acids or -carboxylic acids, 2-methoxy-, 2-chloro- or 2-methyl-5-aminobenzene-1-sulphonic acids, 4-chloro- or 4-methyl-5-aminobenzene-1-sulphonic acids, 5-amino-2-hydroxybenzene-1-carboxylic acid, 5-amino-3-methyl- or -3-sulpho-2-hydroxy-benzene-1-carboxylic acids, 1-aminonaphthalene-4-sulphonic acid, 2-aminonaphthalene-4.8- or -6.8-disulsulphonic acids, 2 - (4′ - aminophenyl) - 6 - methyl-benzothiazole-5- or -7-sulfonic acids.

Either the same or a different o-aminocarboxylic acid of the benzene and naphthalene series can be used as second diazo component, in the latter case, e. g. 2-aminobenzene-1-carboxylic acid, 2-aminobenzene-1.4- or 1.5-dicarboxylic acid, 2-amino-1-carboxybenzene-4- or -5-sulphonic acid and the corresponding sulphonic acid amides, -dimethylamides, -ethanolamides etc., 1-aminonaphthalene-2-carboxylic acid, 2-aminonaphthalene-3-carboxylic acid, in particular however 5-acylamino-2-amino-benzoic acids such as 5-acetylamino-, 5-carbomethoxyamino-, 5-carbethoxyamino-, 5-carbomethoxyethoxyamino-2-aminobenzoic acid, because these have a particularly favourable effect on the drawing power and fastness properties of the dyestuffs produced therewith according to the present invention.

The new, characteristic diazo components are diazotised most advantageously according to the indirect method by the dropwise addition of an aqueous solution of their alkali salts which also contains the necessary amount of alkali nitrite in solution, into diluted mineral acid in the cold.

The coupling is performed in a neutral to alkaline solution or suspension. To produce unsymmetrical-disazo dyestuffs the process is performed in steps and it is of advantage to couple that diazo component in the first step which will lead to a more easily water-soluble monoazo dyestuff intermediate product.

The disazo dyestuffs according to the present invention obtained by salting out from the coupling solution, filtering under suction and drying, are in the form of yellow powders which dissolve well in hot water, if necessary after mixing with inorganic salts having an alkaline reaction such as sodium phosphates or polyphosphates. They dye cellulose fibres direct according to the usual methods in greenish-yellow shades.

The disazo dyestuffs according to the present invention can be coppered in the dyebath or in a fresh bath in a neutral or weakly acid medium with the usual copper salts such as, e. g. copper sulphate or copper acetate. If desired, copper compounds which are stable to alkalies can also be used such as, for example, those obtained by reacting copper sulphate with sodium tartrate in a soda-alkaline bath. The shade is only slightly altered on after-treating the cellulose dyeing with agents giving off copper but the wet fastness and light fastness properties are considerably improved.

The following examples illustrate the invention without limiting it in any way. Where not otherwise stated, the parts are given as parts by weight and the temperatures are in degrees centigrade. The relationship of parts by weight to parts by volume is as that of kilogrammes to litres.

*Example 1*

70.2 parts of 4-aminodiphenyl urea-3-carboxylic acid-3'-sulphonic acid and 16 parts of caustic soda are dissolved in 700 parts of water, mixed with 13.8 parts of sodium nitrite and diazotised by the quick addition of 72 parts of concentrated hydrochloric acid at 5–10°. 12 parts of sodium bicarbonate are sprinkled on the lemon yellow suspension of the diazonium compound and a solution of 35.2 parts of 4.4'-diacetoacetylamino-1.1'-diphenyl and 8 parts of caustic soda in 500 parts of water are added. After 12 hours the thick suspension is slowly heated to 80°, 10% (calculated on the volume obtained) of sodium chloride is added and the disazo dyestuff of the formula:

is a yellow powder which after being mixed with an equal quantity of sodium pyrophosphate dissolves in water and in concentrated sulphuric acid with a yellow colour. Natural or regenerated cellulose fibres are dyed in clear, greenish-yellow shades which, on being treated with copper salts according to the usual methods, only change slightly. The dyeings have excellent wet and light fastness properties.

If in this example, the 35.1 parts of 4-aminodiphenyl urea-3-carboxylic acid-4'-sulphonic acid is replaced by an equal number of parts of 4-aminodiphenyl urea-3-carboxylic acid-3'-sulphonic acid, 43.1 parts of 4-aminodiphenyl urea-3-carboxylic acid-2'.5'-disulphonic acid, 36.5 parts of 2'- or 4'-methyl-4-aminodiphenyl urea-3-carboxylic acid-3'-sulphonic acid, 38.55 parts of 2'- or 4'-chloro-4-aminodiphenyl urea-3-carboxylic acid-3'-sulphonic acid, 37.9 parts of 2'.4'-dimethyl-4-aminodiphenyl urea-3-carboxylic acid-6'-sulphonic acid, 41.1 parts of 4-amino-4'-hydroxydiphenyl urea-3.3'-dicarboxylic acid-5'-sulphonic acid, 33.1 parts of 4-amino-4'-hydroxydiphenyl urea-3.3'-dicarboxylic acid, 31.5 parts of 4-aminodiphenyl urea-3.3'- or -3.4'-dicarboxylic acid, 40.1 parts of 4-aminophenyl-1.1'-naphthyl urea 3-carboxylic acid-4'-sulphonic acid, 48.1 parts of 4-aminophenyl-1.1'-naph-

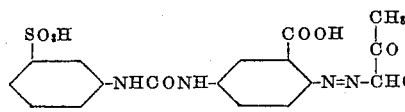 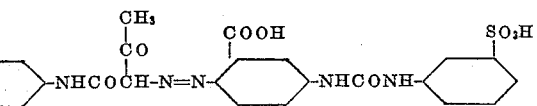

which precipitates is filtered off. When dry the dyestuff is a yellow powder which dissolves in water and in concentrated sulphuric acid with a yellow colour. It has good drawing power onto cellulose fibres and, on after-coppering, it dyes them in pure greenish-yellow shades. The dyeings have excellent wet fastness properties.

If, instead of 35.2 parts of 4.4'-diacetoacetylamino-1.1'-diphenyl, 38.0 parts of 4.4'-diacetoacetylamino-3.3'-dimethyl-1.1'-diphenyl, 42.1 parts of 4.4'-diacetoacetylamino-3.3'-dichloro-1.1'-diphenyl or 41.2 parts of 4.4'-diacetoacetylamino-3.3'-dimethoxy-1.1'-diphenyl are used, similar yellow disazo dyestuffs having the same fastness properties are obtained.

*Example 2*

35.1 parts of 4-aminodiphenyl urea-3-carboxylic acid-4'-sulphonic acid are dissolved in 400 parts of water and 8.2 parts of caustic soda, the solution is mixed with 13.8 parts of sodium nitrite, cooled to 5° and 40 parts of concentrated hydrochloric acid are added. After some time the lemon yellow diazonium compound which has precipitated is neutralised with 9 parts of sodium carbonate and added dropwise to a solution of 38 parts of 4.4'-diacetoacetylamino-3.3'-dimethyl-1.1'-diphenyl in 500 thyl urea-3-carboxylic acid-3'.8'-disulphonic acid, 48.1 parts of 4-aminophenyl-1.2'-naphthyl urea-3-carboxylic acid-4'.8'- or -6'.8'-disulphonic acid or 49.8 parts of a compound of the formula:

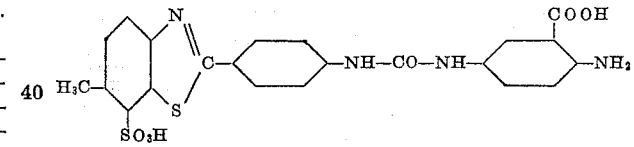

dyestuffs with similar pure shades and properties are obtained.

*Example 3*

35.1 parts of 4-aminodiphenyl urea-3-carboxylic acid-3'-sulphonic acid are diazotised as described in Example 1 and coupled at 10–15° with an alkaline solution of 42.1 parts of 4.4'-diacetoacetylamino-3.3'-dichloro-1.1'-diphenyl and 20 parts of sodium carbonate. 10 parts of sodium bicarbonate and the diazonium compound from 26 parts of 2-aminobenzoic acid-5-sulphonic acid-β-hydroxyethyl amide are added to the suspension of the monoazo dyestuff. The completely formed disazo dyestuff of the formula:

parts of water and 9 parts of caustic soda. As soon as the coupling is completed, 20 parts of sodium bicarbonate and the diazonium compound from 19.4 parts of 5-acetylamino-2-aminobenzoic acid are added. The next day, the whole is slowly heated to 80°, 10% (calculated on the volume obtained) of sodium chloride is added, the whole is stirred for an hour at 80° and then filtered. The disazo dyestuff obtained of the formula:

is slowly heated to 80°, salted out with 15% (calculated on the volume obtained) of sodium chloride and filtered off after one hour. When dry, a yellow powder is obtained which dissolves in water and in concentrated sulphuric acid with a yellow colour. The after-coppered dyeings on cellulose fibres are a pure greenish-yellow and have excellent fastness properties.

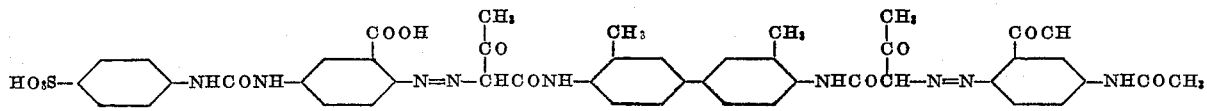

If instead of 35.1 parts of 4-aminodiphenyl urea-3-carboxylic acid-3'-sulphonic acid, any other aminodiphenyl urea-3-carboxylic acid named in Example 2 is used, or instead of 42.1 parts of 4.4'-diacetoacetylamino-3.3'-dichloro-1.1'-diphenyl another of the coupling components given in Example 1 is used and otherwise the same procedure as described in this example is followed, similar disazo dyestuffs with similar fastness properties are obtained.

aminodiphenyl urea-3-carboxylic acid-4'-sulphonic acid and 38.0 parts of 4.4'-diacetoacetylamino-3.3'-dimethyl-1.1'-diphenyl produced according to Example 2. On completion of the coupling the whole is heated slowly to 80°, 350 parts of sodium chloride are added and the precipitate is filtered off after 1 hour. The disazo dyestuff of the formula:

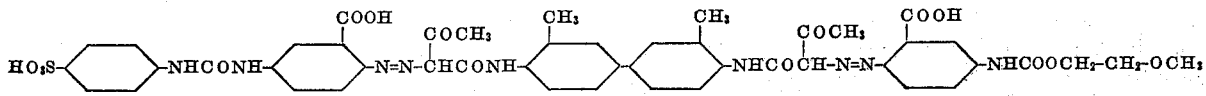

is a yellow powder which dissolves in water and in concentrated sulphuric acid with a yellow colour. It has excellent drawing power on to natural and regenerated cellulose fibres and, when after-coppered, dyes them in clear greenish-yellow shades which have excellent fastness properties.

Example 4

36.5 parts of 4'-methyl-4-aminodiphenyl urea-3-carboxylic acid-3'-sulphonic acid are dissolved in 400 parts of water and 8 parts of caustic soda at 20°, mixed with 6.9 parts of sodium nitrite and then added dropwise at 5–10° to 36 parts of concentrated hydrochloric acid and 80 parts of water. The lemon yellow diazo suspension so obtained is neutralised with 7 parts of sodium carbonate and added dropwise to an alkaline solution of 41.2 parts of 4.4'-diacetoacetylamino-3.3'-dimethoxy-1.1'-diphenyl. On completion of the coupling, 10 parts of sodium bicarbonate in 200 parts of water are added and then the diazonium compound made up from 13.7 parts of 2-aminobenzoic acid is added. The completely formed disazo dyestuff of the formula:

If instead of 38.0 parts of 4.4'-diacetoacetylamino-3.3'-dimethyl-1.1'-diphenyl another of the di-acetoacetylaminodiphenyl compounds named in example 1 is used, similar yellow disazo dyestuffs are obtained which have similar fastness properties.

Example 6

1.0 part of the dyestuff obtained according to Example 2 is dissolved in a dyebath containing 3000 parts of water and 2 parts of soda. 100 parts of cotton are entered at 40–50°, the bath is heated to 90–95° within 30 minutes, 30 parts of sodium sulphate are added and dye-

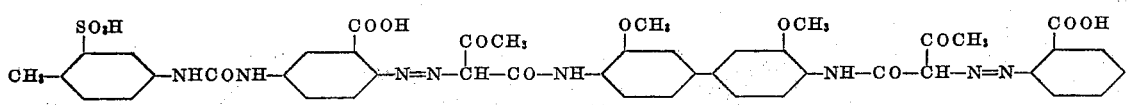

is precipitated by the addition of sodium chloride at 80°, filtered and dried. It is a yellow powder which dissolves in water and in concentrated sulphuric acid with a yellow colour. After-coppered it dyes cotton, staple rayon, viscose, hemp or jute fibres in pure yellow shades which have very good fastness properties.

If in this example, 19.4 parts of 4- or 5-acetylamino-2-aminobenzoic acid, 21.0 parts of 2-amino-1-carboxyphenyl-4- or -5-carbamic acid methyl ester, 22.4 parts of 2-amino-1- carboxyphenyl-4- or -5-carbamic acid ethyl ester, 25.4 parts of 2-amino-1-carboxyphenyl-4- or -5-carbamic acid methoxyethyl ester, 26.8 parts of 2-amino-1-carboxyphenyl-4- or -5-carbamic acid ethoxyethyl ester, 25.2 parts of 5-succinylamino-2-aminobenzoic acid, 18.1 parts of 2-aminobenzene-1.4- or -1.5-dicarboxylic acid, 2-aminobenzoic acid-4- or -5-sulphonic acid, 21.6 parts of 2-aminobenzoic acid-5-sulphonic acid amide, 23.0 parts of 2-aminobenzoic acid-5-sulphonic acid-methylamide, 24.4 parts of 2-aminobenzoic acid-5-sulphonic acid-dimethylamide, 26.0 parts of 2-aminobenzoic acid-5-sulphonic acid-β-oxethylamide, 21.5 parts of 4- or 5-methylsulphonyl-2-aminobenzoic acid, 18.7 parts of 2-aminonaphthalene-3-carboxylic acid or 18.7 parts of 1-aminonaphthalene-2-carboxylic acid are used instead of 13.7 parts of 2-aminobenzoic acid, similar dyestuffs are obtained which have the same fastness properties.

Example 5

25.4 parts of 2-amino-1-carboxyphenyl-5-carbamic acid methoxyethyl ester are dissolved in 180 parts of water with 4.1 parts of caustic soda at 20°, mixed with 30 parts of concentrated hydrochloric acid and diazotised at 0–5° by the addition of 6.9 parts of sodium nitrite in 40 parts of water. The clear solution of the diazonium compound is neutralised with 6.4 parts of sodium carbonate in 60 parts of water and added to the thick liquid solution of the monoazo dyestuff from 35.1 parts of 4- ing is performed for 45 minutes at this temperature. At the end of this time the dyebath is completely exhausted. The dyed goods are rinsed cold and after-treated at 70° for 30 minutes in a fresh bath with 2 parts of crystallised copper sulphate in 2000 parts of water and 2 parts of 30% acetic acid. The goods are rinsed and dried in the usual way. The cotton is dyed in pure greenish-yellow shades which have good fastness to washing, water, perspiration and light.

What we claim is:

1. A copperable disazo dyestuff corresponding to the general formula:

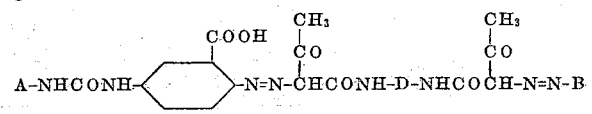

wherein A represents an aromatic radical selected from the benzene and naphthalene series which contains an acid water-solubilising group, B represents a member selected from the group consisting of o-carboxyphenyl, o-monocarboxynaphthyl and o-carboxydiphenylurea radicals, and D represents an unsulphonated 4.4'-diphenyl radical.

2. A copperable disazo dyestuff corresponding to the general formula:

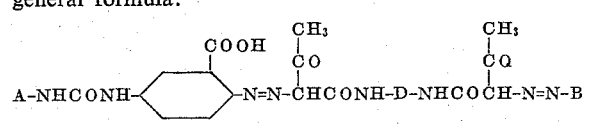

wherein A represents a sulphonated phenyl radical, B represents a member selected from the group consisting of o-carboxylphenyl, o-monocarboxynaphthyl and o-carboxydiphenylurea radicals, and D represents an unsulphonated 4.4'-diphenyl radical.

3. A copperable disazo dyestuff corresponding to the general formula:

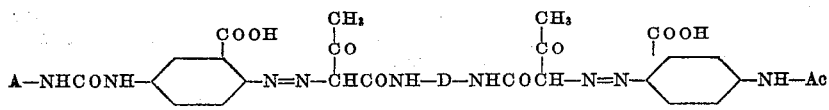

wherein A represents a sulphonated phenyl radical, D represents an unsulphonated 4.4'-diphenyl radical and Ac represents a carboxylic acid acyl radical.

4. A copperable disazo dyestuff corresponding to the formula:

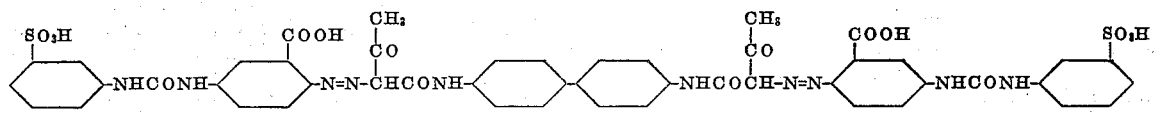

5. A copperable disazo dyestuff corresponding to the formula:

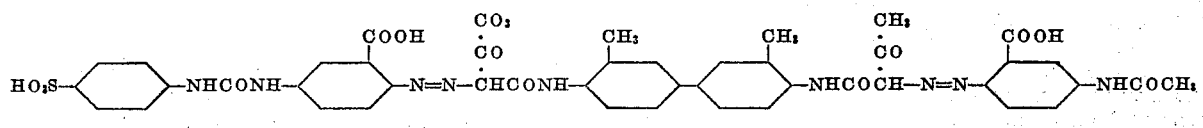

6. A copperable disazo dyestuff corresponding to the formula:

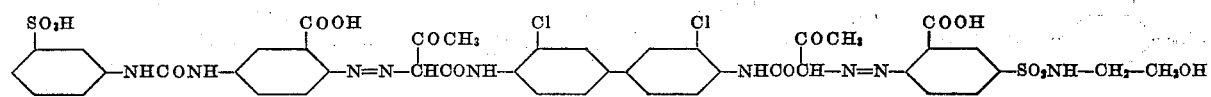

7. A copperable disazo dyestuff corresponding to the formula:

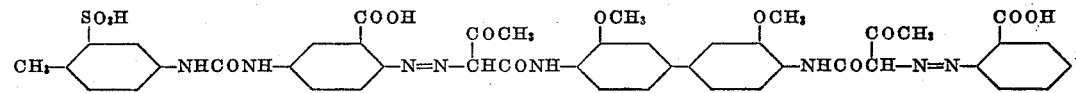

8. A coperable disazo dyestuff corresponding to the formula:

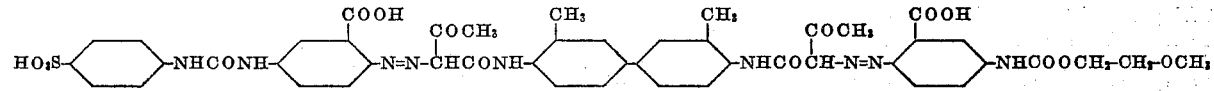

References Cited in the file of this patent
UNITED STATES PATENTS

| | | |
|---|---|---|
| 1,560,949 | Stusser | Nov. 10, 1925 |
| 2,515,546 | Bossard et al. | July 18, 1950 |